US008026641B2

(12) United States Patent
Lee (10) Patent No.: US 8,026,641 B2
(45) Date of Patent: Sep. 27, 2011

(54) STEP ACTUATOR APPARATUS

(75) Inventor: Hong Kon Lee, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 213 days.

(21) Appl. No.: 12/515,887

(22) PCT Filed: Nov. 3, 2008

(86) PCT No.: PCT/KR2008/006475
§ 371 (c)(1),
(2), (4) Date: May 21, 2009

(87) PCT Pub. No.: WO2010/013867
PCT Pub. Date: Feb. 4, 2010

(65) Prior Publication Data
US 2011/0095629 A1    Apr. 28, 2011

(30) Foreign Application Priority Data

Jul. 28, 2008  (KR) .................. 10-2008-0073768

(51) Int. Cl.
*H02K 37/00* (2006.01)
*H02K 5/22* (2006.01)
(52) U.S. Cl. ................. 310/49.18; 310/71; 310/80
(58) Field of Classification Search .... 310/49.01–49.55, 310/71, 80; 251/129.11; *H02K 37/00, 37/04, H02K 5/22*
See application file for complete search history.

(56) References Cited

U.S. PATENT DOCUMENTS

| | | | |
|---|---|---|---|
| 5,747,897 A * | 5/1998 | Iwasa et al. | 310/49.12 |
| 5,845,390 A * | 12/1998 | Cheng et al. | 29/596 |
| 6,317,332 B1 | 11/2001 | Weber et al. | |
| 6,577,030 B2 * | 6/2003 | Tominaga et al. | 310/68 B |
| 6,707,185 B2 * | 3/2004 | Akutsu et al. | 310/71 |
| 6,888,277 B2 * | 5/2005 | Watzek et al. | 310/90 |
| 7,151,333 B2 * | 12/2006 | Suzuki et al. | 310/71 |
| 7,408,277 B2 * | 8/2008 | Huang | 310/49.18 |
| 7,909,130 B2 * | 3/2011 | Morikawa et al. | 180/444 |
| 2003/0214191 A1 * | 11/2003 | Watzek et al. | 310/80 |
| 2005/0264113 A1 * | 12/2005 | Suzuki et al. | 310/80 |
| 2006/0055278 A1 * | 3/2006 | Zhou | 310/257 |
| 2007/0222329 A1 * | 9/2007 | Bin | 310/257 |
| 2008/0164784 A1 * | 7/2008 | Huang | 310/49 R |

FOREIGN PATENT DOCUMENTS

| | | |
|---|---|---|
| JP | 7177694 A | 7/1995 |
| JP | 10322963 A | 12/1998 |
| JP | 2004-072990 A | 3/2004 |

OTHER PUBLICATIONS

Office Action dated Jun. 8, 2011 in Canadian Application No. 2,668,042, filed May 25, 2009.

* cited by examiner

*Primary Examiner* — Quyen Leung
*Assistant Examiner* — Thomas Truong
(74) *Attorney, Agent, or Firm* — Saliwanchik, Lloyd & Eisenschenk

(57) ABSTRACT

Disclosed is a step actuator apparatus. The step actuator includes a step actuator including a housing, a stator installed in the housing, a rotor rotating by a reaction with the stator and a screw member coupled to the rotor and moving linearly according to rotation of the rotor; and a circuit board module including a circuit board electrically connected to the step actuator and a case for supporting the circuit board. The housing has a first opening. The case includes a plurality of hooks inserted into the first opening.

13 Claims, 6 Drawing Sheets

STEP ACTUATOR APPARATUS

This application is the U.S. national stage application of International Patent Application No. PCT/KR2008/006475, filed Nov. 3, 2008, which claims priority to Korean Application No. 10-2008-0073768, filed Jul. 28, 2008, the disclosures of each are hereby incorporated by reference in their entirety.

TECHNICAL FIELD

The present invention relates to a step actuator apparatus.

BACKGROUND ART

A step actuator apparatus includes a step actuator which is provided with a rotor and a stator and linearly operates a shaft according to rotation of the rotor, and a circuit board for operating the step actuator.

For instance, the step actuator apparatus is connected to a member, which drives a reflector of a vehicle headlight system, in order to change the direction of illumination. In addition, the step actuator apparatus converts the rotational movement of the rotor into the linear movement, so the step actuator apparatus can be applied to various electric and mechanical devices requiring the linear action.

DISCLOSURE

Technical Problem

The embodiment provides a step actuator apparatus including a step actuator having a novel structure.

The embodiment provides a step actuator apparatus capable of securely coupling a step actuator to a case.

The embodiment provides a step actuator apparatus capable of easily coupling a step actuator to a case.

Technical Solution

A step actuator apparatus according to the embodiment includes a step actuator including a housing, a stator installed in the housing, a rotor rotating while interacting with the stator and a screw member coupled to the rotor and rotating according to rotation of the rotor; and a circuit board module including a circuit board electrically connected to the step actuator and a case for supporting the circuit board, wherein the housing has a first opening, and the case includes a plurality of hooks inserted into the first opening.

A step actuator apparatus according to the embodiment includes a step actuator including a cylindrical housing, a stator installed in the housing, a rotor, which is installed radially inward from the stator and rotates while interacting with the stator, and a screw member coupled to the rotor and rotating through rotation of the rotor; and a circuit board module including a circuit board electrically connected to the step actuator and a case for supporting the circuit board, wherein the case has a curved coupling surface making contact with the housing.

Advantageous Effects

The embodiment can provide a step actuator apparatus including a step actuator having a novel structure.

The embodiment can provide a step actuator apparatus capable of securely coupling a step actuator to a case.

The embodiment can provide a step actuator apparatus capable of easily coupling a step actuator to a case.

MODE FOR INVENTION

Hereinafter, a step actuator apparatus according to an embodiment will be described in detail with reference to accompanying drawings. Some components are exaggerated, omitted or schematically drawn in the attached drawings, and a size of each component does not utterly reflect an actual size.

Figure 1:
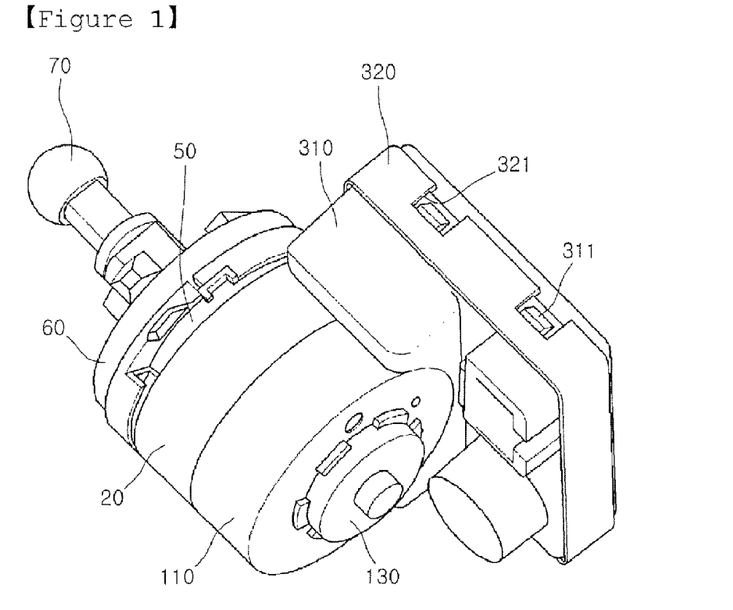
FIG. 1 is a perspective view showing a step actuator apparatus according to the embodiment.
Figure 2:
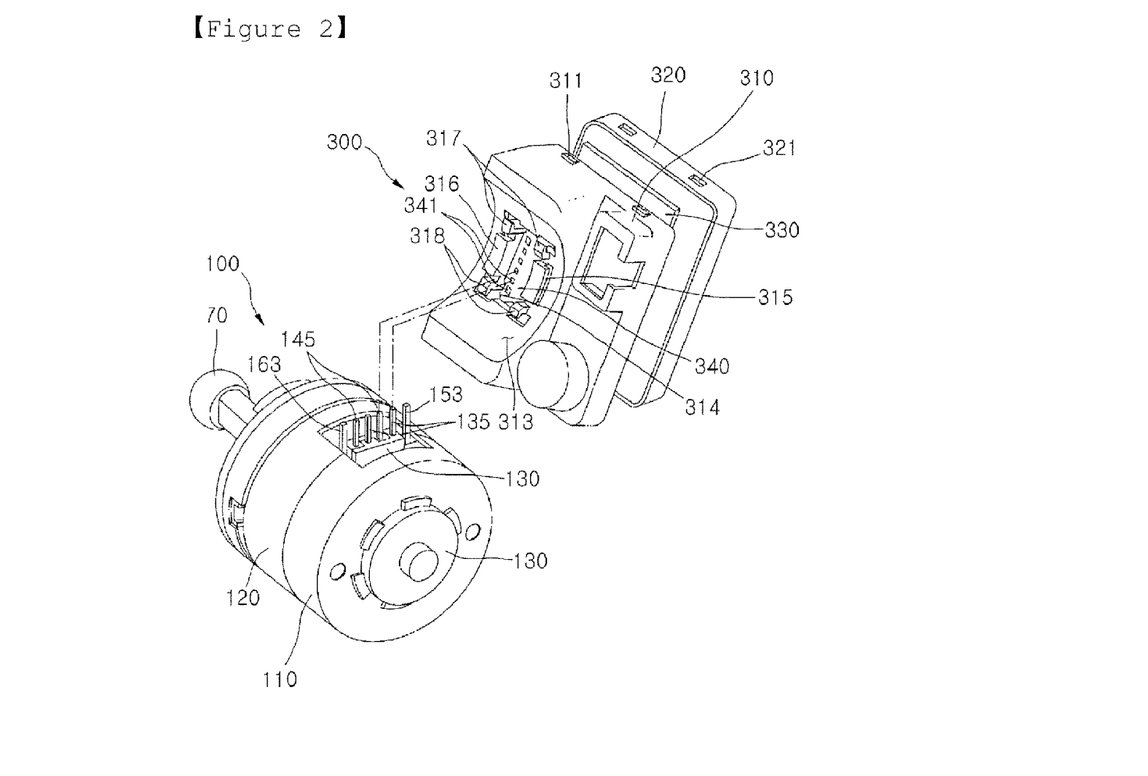
FIG. 2 is an exploded perspective view showing a step actuator apparatus according to the embodiment.

FIG. 1 is a perspective view showing a step actuator apparatus according to the embodiment, and FIG. 2 is an exploded perspective view showing a step actuator apparatus according to the embodiment. As shown in FIGS. 1 and 2, a step actuator apparatus according to the embodiment includes a step actuator 100 and a circuit board module 300 on which the step actuator 100 is mounted.

The step actuator 100 includes a first housing 110 having a cylindrical shape and a second housing 120. A stator and a rotor are provided between the first housing 110 and the second housing 120. As the rotor rotates according to power applied from the circuit board module 300, a screw member (not shown) coupled to the rotor linearly reciprocates.

The circuit board module 300 includes a first case 310 and a second case 320. A first circuit board 330 and a second circuit board 340 are installed between the first case 310 and the second case 320. The first case 310 is coupled to the first housing 110 and the second housing 120 of the step actuator 100 while making contact with the first housing 100 and the second housing 120.

Hereinafter, the step actuator 100 of the step actuator apparatus according to the embodiment will be described.

Figure 3:
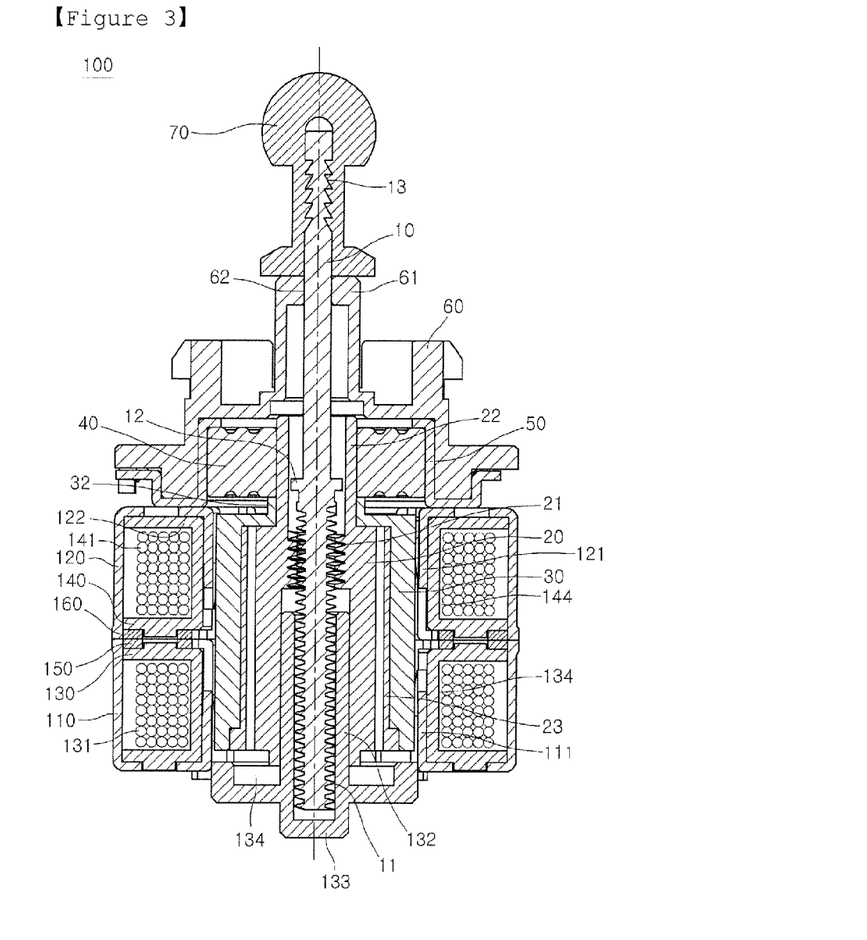
FIG. 3 is a sectional view showing a step actuator according to the embodiment.
Figure 4:
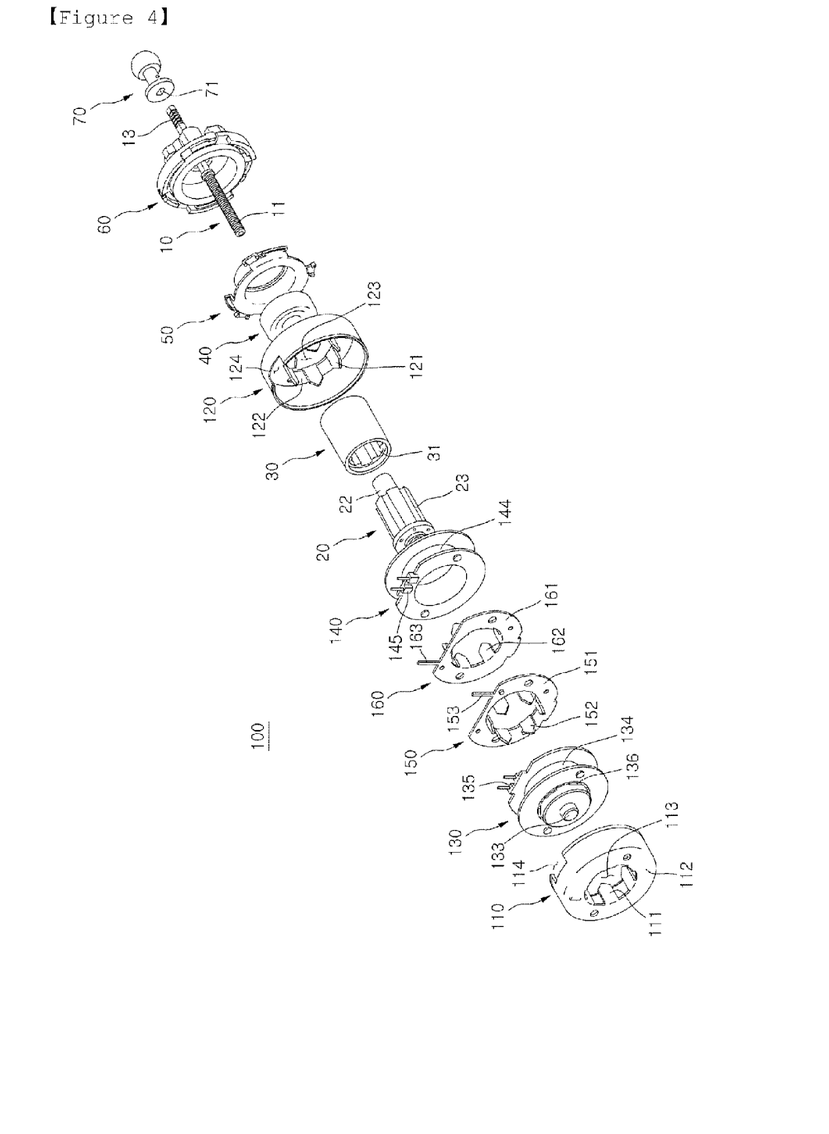
FIGS. 4 and 5 are exploded perspective views showing a step actuator according to the embodiment.
Figure 5:
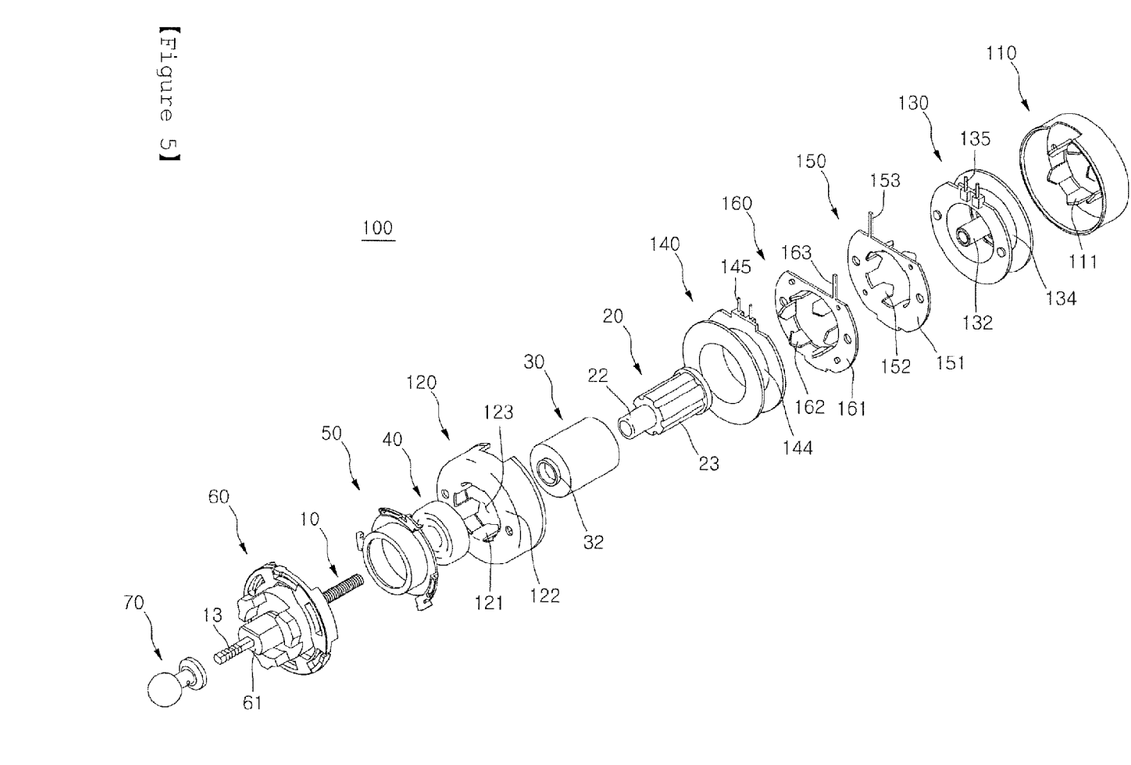
Figure 6:
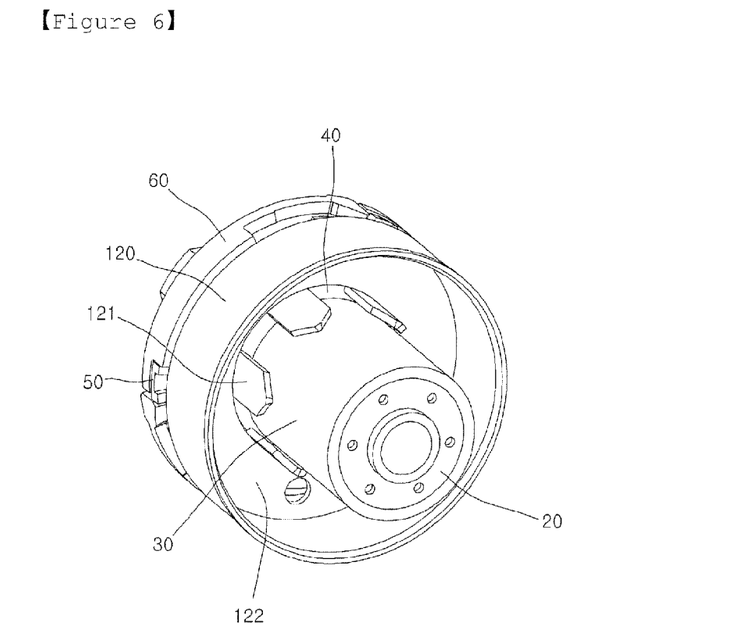
FIG. 6 is a view showing a bearing which is supported by a second housing of a step actuator from a first direction according to the embodiment.

FIG. 3 is a sectional view showing the step actuator according to the embodiment, FIGS. 4 and 5 are exploded perspective views showing the step actuator according to the embodiment, and FIG. 6 is a view showing the bearing which is supported by the second housing of the step actuator from the first direction according to the embodiment.

As shown in FIGS. 3 to 6, the step actuator 100 according to the embodiment includes the stator, the rotor rotating through interaction with the stator, a screw member 10, which is coupled to the rotor to linearly reciprocate in a first direction and a second direction according to forward and reverse rotation of the rotor, and a joint 70 coupled to the screw member 10.

The stator includes a first bobbin 130, a second bobbin 140, a first yoke 150 and a second yoke 160, in which the first bobbin 130, the second bobbin 140, the first yoke 150 and the second yoke 160 are disposed between the first housing 110 and the second housing 120.

The rotor includes a magnet 30, which is disposed within the stator to rotate through interaction with the stator, and a nut member 20 coupled to the magnet 30.

The screw member 10 and the nut member 20 are coupled to each other by a nut and bolt assembly. Accordingly, as the nut member 20 rotates, the screw member 10 makes a linear motion.

The first bobbin 130 and the second bobbin 140 are disposed in a space formed between the first housing 110 and the second housing 120. The first yoke 150 and the second yoke 160 are disposed between the first bobbin 130 and the second bobbin 140.

In addition, the magnet 30, the nut member 20 and the screw member 10 are disposed radially inward from the first bobbin 130 and the second bobbin 140.

Further, a bearing 40, a bearing cover 50 and a mounting member 60 are disposed at one side of the second housing 120.

In detail, as the step actuator 100 according to the embodiment operates, the screw member 10 linearly reciprocates in the first direction and the second direction opposite to the first direction, that is, in the axial direction of the screw member 10.

In addition, the screw member 10 has a first end inserted into a protrusion pipe 132 of the first bobbin 130 and a second end extending by passing through a protrusion part 61 of the mounting member 60. The joint 70 is coupled to the second end of the screw member 10.

A screw thread 11 is formed at an outer surface of the first end of the screw member 10. A stopper 12 is formed between the screw thread 11 and the second end of the screw member 10.

The screw thread 11 of the screw member 10 is coupled to a screw thread 21 formed at an inner surface of the nut member 20. Accordingly, as the nut member 20 rotates, the screw member 10 moves in the first direction and the second direction.

The stopper 12 restrains movement of the screw member 10 in the second direction. When the screw member 10 moves in the second direction, the stopper 12 is locked with the protrusion part 61 of the mounting member 60, so that the screw member 10 does not move in the second direction. In addition, a blocking part 133 is formed at a first end of the protrusion pipe 132 of the first bobbin 130, so that movement of the screw member 10 is restrained in the first direction.

The movement of the screw member 10 in the second direction can be restrained by minimizing the diameter of a through hole 62 of the protrusion part 61 formed in the mounting member 60 such that the screw thread 11 of the screw member 10 does not pass through the through hole 62. Similarly, the movement of the screw member 10 can be restrained in the first direction by minimizing the diameter of the first end of the protrusion pipe 132 such that the screw thread 11 of the screw member 10 does not pass through the protrusion pipe 132. Accordingly, various modifications for the blocking part 133 and the stopper 12 can be made by the person skilled in the art. Meanwhile, as described above, the screw member 10 makes a linear motion in the first direction and the second direction by passing through the mounting member 60. However, the screw member 10 does not rotate in the about an axis thereof. That is, rotation of the screw member 10 is restrained by the protrusion part 61 of the mounting member 60.

For example, the second end of the screw member 10 is cut into a 'D' shape, and the though hole 62 of the mounting member 60 has a shape mating with a cross section of the second end of the screw member 10.

Accordingly, since the screw member 10 does not rotate, the screw member 10 makes a linear motion in the first direction and the second direction when the nut member 20 coupled to the screw member 10 rotates.

As described above, the joint 70 is coupled to the second end of the screw member 10. The joint 70 can be coupled to various mechanical tools for transferring power generated by the linear motion of the screw member 10. The mechanical tools can be selected according to the type of equipment employing the step actuator apparatus of the embodiment.

A filling groove 13 is formed at the second end of the screw member 10, and the joint 70 is partially filled in the filling groove 13. Accordingly, the screw member 10 is securely coupled to the joint 70 in the axial direction of the screw member 10.

For example, the filling groove 13 can be formed performing a knurling process or a tapping process on the screw member 10. A joint hole 71 is formed in the joint 70. The screw member 10 having the filling groove 13 is inserted into the joint hole 71. In a state that the screw member 10 is inserted into the joint hole 71, heat or ultrasonic wave is applied to the joint 70 to melt the joint 70, so that the melted part of the joint 70 is filled in the filling groove 13. External force may be applied to the filling groove 13 such that the melted part of the joint 70 is effectively filled in the filling groove 13.

When the heat or ultrasonic wave is removed, the joint 70 is cured, so that the screw member 10 is securely coupled to the joint 70. The nut member 20 is inserted into the magnet 30, and a second end 22 of the nut member 20 protrudes in the second direction by passing through the magnet 30. A protrusion 23 extends in the axial direction from an outer circumference of the nut member 20 such that the nut member 20 is coupled to the magnet 30 having a groove 31 formed in an inner circumference 30 thereof mating with the protrusion 23.

The nut member 20 and the magnet 30 are alternately arranged in the circumferential direction while partially overlapping with each other by the protrusion 23 and the groove 31. Accordingly, force applied in the circumferential direction through rotation of the magnet 30 is transferred to the nut member 20, and the nut member 20 rotates together with the magnet 30 as the magnet 30 rotates. For example, the protrusion 23 and the groove 31 have a curved surface such that the groove 31 of the magnet 31 is easily processed.

The second end 22 of the nut member 20 is coupled to an inner wheel of the bearing 40. Accordingly, the nut member 20 is rotatably supported by the bearing 40 and rotates without interference. In addition, the screw thread 21 is formed at a substantially center part of an inner circumferential surface of the nut member 20 such that the screw thread 21 is coupled to the screw thread 11 of the screw member 10. In addition, an inner peripheral surface of the first end of the nut member 20 is coupled to the protrusion pipe 132 of the first bobbin 130 such that the nut member 20 is rotatably supported. That is, the inner peripheral surface of the first end of the nut member 20 makes contact with an outer peripheral surface of the protrusion pipe 132.

The magnet 30 includes permanent magnets that are alternately magnetized with an N pole and an S pole in the circumferential direction. As described above, since the nut member 20 is inserted into the magnet 30, the nut member 20 can rotate together with the magnet 30.

Meanwhile, a second end 32 of the magnet 30 protrudes in the second direction and makes contact with the inner wheel of the bearing 40. The second end 32 of the magnet 30 allows the magnet 30 to smoothly rotate without interfering with an outer wheel of the bearing 40. The first bobbin 130 having a first coil 131 and the second bobbin 140 having a second coil 141 are disposed at an outer circumferential surface of the magnet 30. The first yoke 150 and the second yoke 160 are disposed between the first bobbin 130 and the second bobbin 140.

The first bobbin 130 has a first coil winding unit 134, around which the first coil 131 is wound in the circumferential direction, and a first terminal unit 135 for applying current to the first coil 131. Similarly, the second bobbin 140 has a second coil winding unit 144, around which the second coil 141 is wound in the circumferential direction, and a second terminal unit 145 for applying current to the second coil 141.

As described above, the first bobbin 130 has the protrusion pipe 132, into which the screw member 10 is inserted, and a slit 136, into which a third tooth 111 of the first housing 110 is inserted. The first bobbin 130 faces the magnet 30 and the nut member 20 from the first direction. A recess 134 is formed in the bobbin 30 so as to reduce friction generated by the first bobbin 130, the magnet 30 and the nut member 20 when the magnet 30 and the nut member 20 move in the first direction and the second direction.

The first yoke 150 includes a first body unit 151 having a ring shape, a first tooth 152, which protrudes toward the first housing 110 from an inner circumference of the first body unit 151 and disposed between the first bobbin 130 and the magnet 30, and a first ground terminal unit 153 for grounding the first body unit 151.

The second yoke 160 includes a second body unit 161 having a ring shape, a second tooth 162, which protrudes toward the second housing 120 from an inner circumference of the second body unit 161 and disposed between the second bobbin 140 and the magnet 30, and a second ground terminal unit 163 for grounding the second body unit 161.

Meanwhile, the third tooth 111 protruding toward the second housing 120 is formed on the first housing 110 such that the third tooth 111 is disposed between the first bobbin 130 and the magnet 30 by passing through the slit 136 of the first bobbin 130. The third tooth 111 and the first tooth 152 are alternately disposed along an outer circumference of the magnet 30.

The first housing 110 has a first rim part 112 protruding radially inward from a cylindrical body of the first housing 110. The third tooth 111 extends from the first rim part 112 in the second direction. A side of the first bobbin 130 is inserted into a first opening part 113 defined by the first rim part 112.

In addition, a fourth tooth 121 protruding toward the first housing 110 is formed on the second housing 120 and disposed between the second bobbin 140 and the magnet 30. The fourth tooth 121 and the second tooth 162 are alternately disposed along the circumference of the magnet 30.

The second housing 120 has a second rim part 122 protruding radially inward from a cylindrical body of the second housing 120. The fourth tooth 121 extends from the second rim part 122 in the first direction.

Meanwhile, a first cutting part 114 is formed by partially cutting the cylindrical body of the first housing 110, and a second cutting part 124 is formed by partially cutting the cylindrical body of the second housing 120. The first cutting part 114 and the second cutting part 124 form a first opening through which the first terminal unit 135 formed on the first bobbin 130, the first ground terminal 153 formed on the first yoke 150, the second ground terminal unit 163 formed on the second yoke 160 and the second terminal unit 145 formed on the second bobbin 140 protrude to the outside.

The bearing 40 is disposed at a second end of the second housing 120, and the bearing cover 50 for supporting the bearing 40 is installed on the second end of the second housing 120. That is, the bearing cover 50 is coupled to the second housing 120, thereby restraining the bearing 40. For example, the second housing 120 is coupled to the bearing cover 50 through a spot welding process or a laser welding process.

As described above, the inner wheel of the bearing 40 is supported by the second end of the nut member 20.

The movement of the bearing 40 is restrained in the first direction by the second rim part 122 of the second housing 120, and the movement of the bearing 40 is restrained in the second direction by the bearing cover 50.

A second opening part 123 formed by the second rim part 122 has a diameter which is larger than that of the magnet 30 and smaller than that of the bearing 40, thereby preventing friction from occurring between the magnet 30 and the second housing 120, in addition, preventing the bearing 40 from moving in the first direction.

As shown in FIG. 6, the nut member 20 is inserted into the magnet 30 and then coupled to the inner wheel of the bearing 40. The bearing cover 50 is coupled to the second housing 120 from the second direction, and the mounting member 60 is coupled to the bearing cover 50 from the second direction.

The bearing 40 is installed between the bearing cover 50 and the second housing 120, so that the movement of the bearing 40 is restrained in the first direction by the second rim part 122 of the second housing 120.

Referring to FIG. 6, a part of the bearing 40 is exposed between the second rim part 122 and the magnet 30, and the movement of the bearing 40 in the first direction can be restrained by the second rim part 122 that blocks the remaining part of the bearing 40. Referring again to FIGS. 1 and 2, the circuit board module 300 includes a first circuit board 330 and the second circuit board 340 electrically connected to the first circuit board 330. The first circuit board 330 controls the step actuator 100 provided in the first case 310 and the second case 320. Although the circuit board module according to the embodiment includes the two circuit boards, the circuit board module is not limited thereto. According to another embodiment, the circuit board module may include only one circuit board.

The circuit board module 300 is electrically connected to the step actuator 100 while supporting the step actuator 100. The circuit board module 300 is connected to an external control unit through a communication net, for example, a LIN (Local International Network). A coupling surface 313 having a curved shape corresponding to a shape of the step actuator 100 is formed at a coupling part where the first case 310 is coupled to the step actuator 100. Accordingly, the first case 310 is closely coupled to the step actuator 100. In addition, a case coupling hook 311 is formed at a side of the first case 310, and a hook coupling hole 321 is formed in the second case 320 such that the first case 310 is securely coupled to the second case 320 through the case coupling hook 311 and the hook coupling hole 321.

In addition, the coupling surface 313 of the first case 310 is partially open to form a second opening 314. The second circuit board 340 is exposed toward the step actuator 100 through the second opening 314. A plurality of terminal grooves 341 are formed in the second circuit board 340, so that the first terminal unit 135, the second terminal unit 145, the first ground terminal unit 153 and the second ground terminal unit 163 of the step actuator 100 are inserted into the terminal grooves 341. Accordingly, the step actuator 100 is electrically connected to the second circuit board 340.

As described above, the first terminal unit 135, the second terminal unit 145, the first ground terminal unit 153 and the second ground terminal unit 163 of the step actuator 100 can protrude to the outside due to the first cutting part 114 of the first housing 110 and the second cutting part 124 of the second housing 120.

In addition, a first hook 315, a second hook 316, a third hook 317 and a fourth hook 318 are formed on the first case 310. The first hook 315, the second hook 316, the third hook 317 and the fourth hook 318 are inserted into the first opening formed by the first cutting part 114 of the first housing 110 and the second cutting part 124 of the second housing 120, so that the first case 310 is coupled to the first housing 110 and the second housing 120.

The first hook 315 prevents the step actuator 100 from being shaken in the second direction and the second hook 316 prevents the step actuator 100 from being shaken in the first direction. In addition, the third hook 317 and the fourth hook 318 prevent the step actuator 100 from being shaken in the circumferential direction. Accordingly, the first hook 315, the second hook 316, the third hook 317 and the fourth hook 318 prevent the step actuator 100 from being shaken in the axial direction and the circumferential direction.

Figure 7:
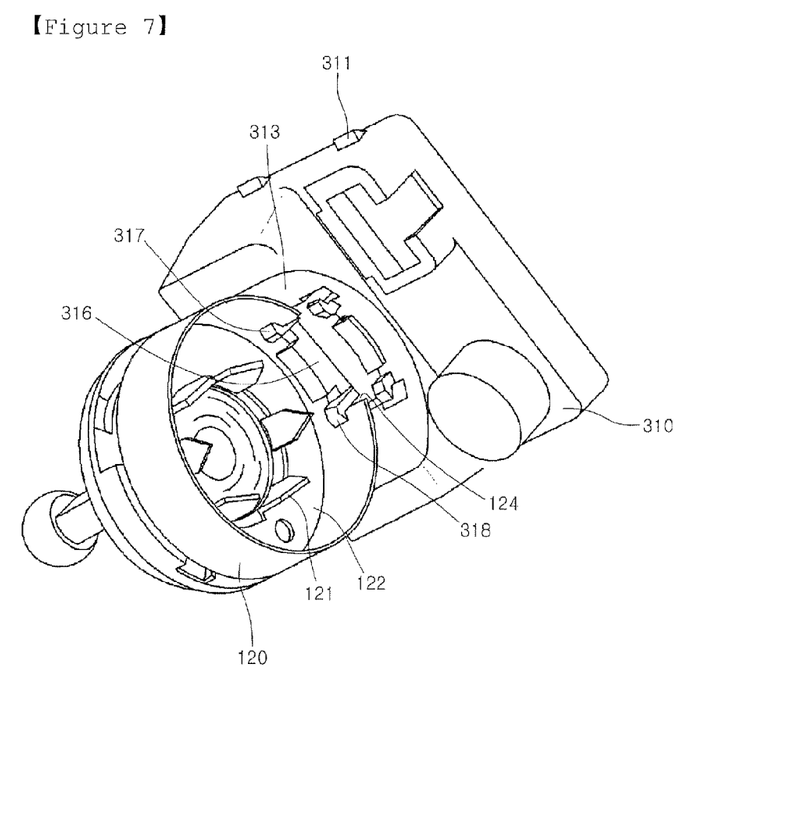
FIGS. 7 to 9 are views showing a method for coupling a step actuator to a circuit board module.
Figure 8:
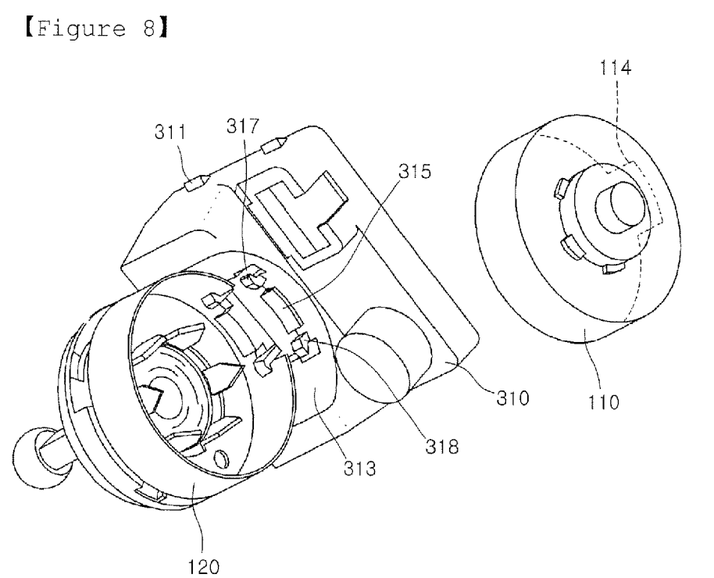
Figure 9:
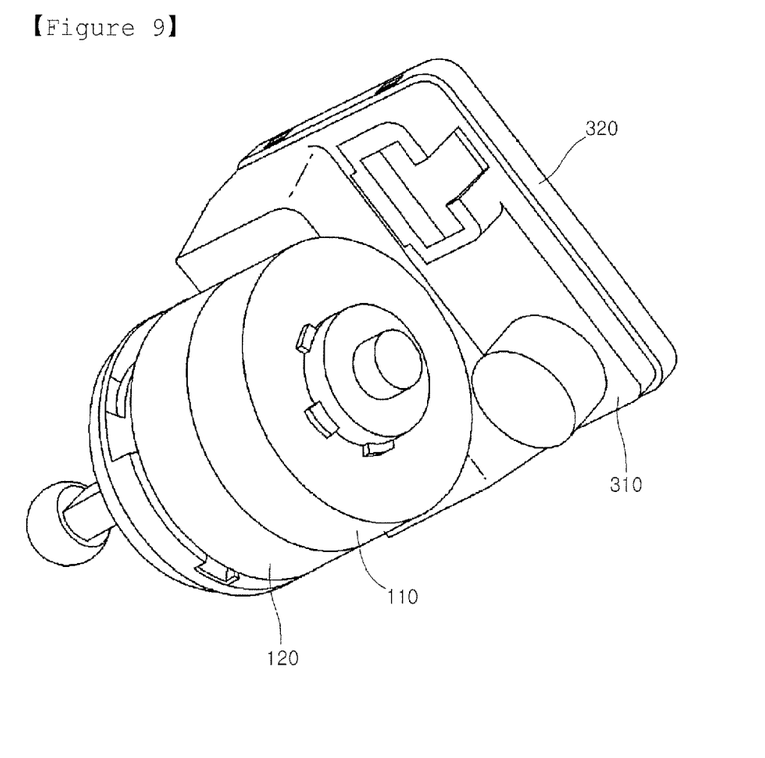

FIGS. 7 to 9 are views showing a method for coupling a step actuator to a circuit board module.

As shown in FIG. 7, the second housing 120 is coupled to the first case 310 from the second direction such that the second cutting part 124 is locked with the second hook 316, the third hook 317 and the fourth hook 318. The second housing 120 adheres to the coupling surface 313 of the first case 310.

As shown in FIG. 8, the first housing 110 is coupled to the first case 310 from the first direction such that the first cutting part 114 is locked with the first hook 315, the third hook 317 and the fourth hook 318. The first housing 110 adheres to the coupling surface 313 of the first case 310.

For convenience sake, the first bobbin 130, the second bobbin 140, the first yoke 150, the second yoke 160, the magnet 30, the nut member 20 and the screw member 10 are omitted from FIG. 8.

Referring to FIG. 9, the first housing 110 and the second housing 120 are coupled to the first case 310.

According to the step actuator apparatus of the embodiment, the step actuator 100 can be easily and securely coupled to the circuit board module 300.

Although few embodiments of the present invention have been shown and described, it would be appreciated by those skilled in the art that changes may be made in these embodiments without departing from the principles and sprit of the invention, the scope of which is defined in the claims and their equivalents.

INDUSTRIAL APPLICABILITY

The step actuator apparatus according to the embodiment can convert rotational movement into a linear movement, so the step actuator apparatus of the embodiment can be applied in various electric and mechanical apparatuses requiring the linear movement.

The invention claimed is:
1. A step actuator apparatus comprising:
a step actuator including a housing, a stator installed in the housing, a rotor rotating by a reaction with the stator, and a screw member coupled to the rotor and moving linearly according to rotation of the rotor; and
a circuit board module including a circuit board electrically connected to the step actuator and a case for supporting the circuit board, wherein the housing has a first opening, and the case includes a plurality of hooks inserted into the first opening, wherein the hooks include a first hook for restraining movement of the housing in a first direction, a second hook for restraining movement of the housing in a second direction opposite to the first direction, a third hook for preventing the housing from rotating clockwise and a fourth hook for preventing the housing from rotating counterclockwise.

2. The step actuator apparatus as claimed in claim 1, wherein the hooks restrain movement of the housing in an axial direction and a circumferential direction.

3. The step actuator apparatus as claimed in claim 1, wherein the case has a second opening through which the circuit board is exposed.

4. The step actuator apparatus as claimed in claim 3, wherein a terminal unit of the stator is exposed through the first opening of the housing and coupled to a terminal groove formed in the circuit board through the second opening of the case.

5. The step actuator apparatus as claimed in claim 1, wherein a plurality of third hooks and fourth hooks are provided.

6. The step actuator apparatus as claimed in claim 1, wherein the housing includes a first housing and a second housing coupled to the first housing.

7. The step actuator apparatus as claimed in claim 6, wherein a first cutting part is formed in a cylindrical body of the first housing by partially cutting the cylindrical body of the first housing, a second cutting part is formed in a cylindrical body of the second housing by partially cutting the cylindrical body of the Second housing, and the first opening is defined by the first cutting part and the second cutting part.

8. The step actuator apparatus as claimed in claim 1, wherein the case includes a first case coupled to the step actuator and a second case coupled to the first case.

9. The step actuator apparatus as claimed in claim 8, wherein a case coupling hook is formed on the first case and a hook coupling hole is formed in the second case, so that the first case is coupled to the second case through the case coupling hook and the hook coupling hole.

10. A step actuator apparatus comprising:
a step actuator including a cylindrical housing, a stator installed in the housing, a rotor, which is installed radially inward from the stator and rotates by a reaction with the stator, and a screw member coupled to the rotor and moving linearly according to rotation of the rotor; and
a circuit board module including a circuit board electrically connected to the step actuator and a case for supporting the circuit board, wherein the case includes a curved coupling surface making contact with the housing, wherein the case includes a first case coupled to the step actuator and a second case coupled to the first case;

wherein a first opening is formed in the cylindrical body of the housing and a second opening corresponding to the first opening is formed in the coupling surface of the case, wherein the case is provided with a plurality of hooks inserted into the first opening, wherein the hooks restrain movement of the housing in an axial direction and a circumferential direction, wherein the hooks include a first hook for restraining movement of the housing in a first direction, a second hook for restraining movement of the housing in a second direction opposite to the first direction, a third hook for preventing the housing from rotating clockwise and a fourth hook for preventing the housing from rotating counterclockwise.

11. The step actuator apparatus as claimed in claim 10, wherein a terminal unit of the stator protrudes through the first opening and is coupled to a terminal groove formed in the circuit board through the second opening.

12. The step actuator apparatus as claimed in claim 10, wherein the housing includes a first housing and a second housing coupled to the first housing.

13. The step actuator apparatus as claimed in claim 10, wherein a case coupling hook is formed on the first case and a hook coupling hole is formed in the second case, so that the first case is coupled to the second case by engagement of the case coupling hook with the hook coupling hole.

* * * * *